May 15, 1962 W. N. POUNDSTONE 3,034,808
FLEXIBLE PIPE COUPLING
Filed Oct. 9, 1958 2 Sheets-Sheet 1
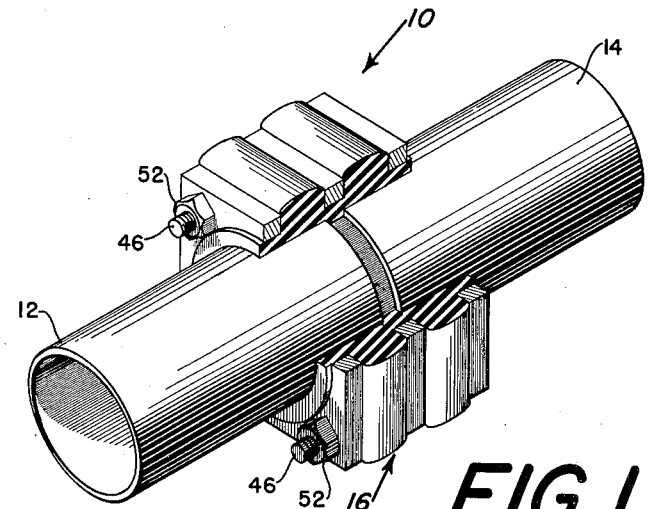
FIG. 1
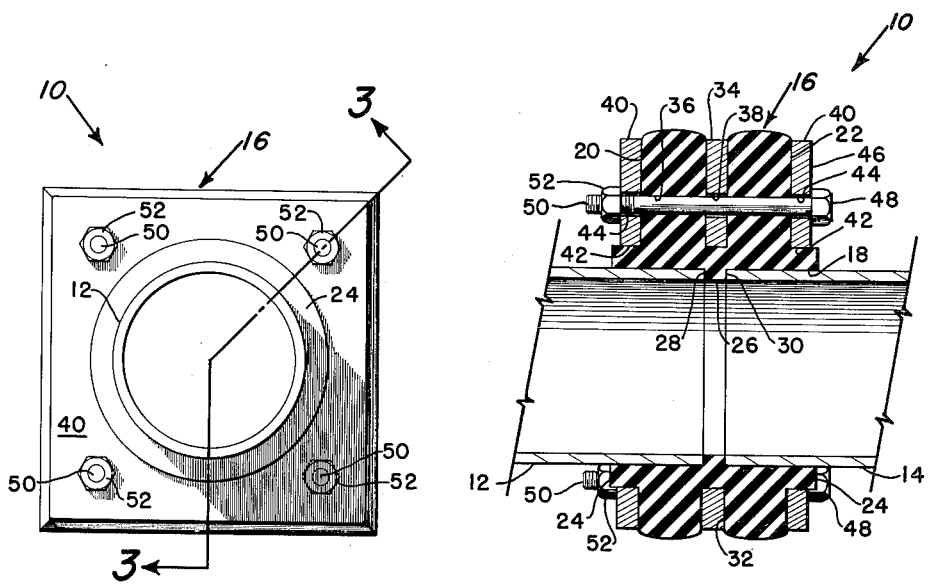
FIG. 2
FIG. 3
INVENTOR.
WILLIAM. N. POUNDSTONE
BY Stanley J Price
HIS ATTORNEY May 15, 1962 W. N. POUNDSTONE 3,034,808
FLEXIBLE PIPE COUPLING Filed Oct. 9, 1958 2 Sheets-Sheet 2

INVENTOR.
WILLIAM N. POUNDSTONE
BY Stanley J Price

HIS ATTORNEY

United States Patent Office 3,034,808
Patented May 15, 1962

3,034,808
FLEXIBLE PIPE COUPLING
William N. Poundstone, Morgantown, W. Va., assignor to Consolidation Coal Company, Pittsburgh, Pa., a corporation of Pennsylvania
Filed Oct. 9, 1958, Ser. No. 766,254
3 Claims. (Cl. 285—235)

This invention relates to a flexible coupling device and more particularly to a pipe coupling for connecting the end sections of conduits, tubing or pipes.

The general object of this invention is to provide a flexible pipe coupling that does not require the use of special tools to secure the coupling to the pipe end sections nor special fabrication of the pipe end sections such as externally threading the end sections or welding a flange thereto.

Generally, my coupling includes a resilient flexible member with a central bore therethrough. A pair of end plates having a central aperture therethrough are positioned in abutting relation with the end walls of the resilient flexible member. The pipe end sections are inserted in the bore of the flexible resilient member and the end plates are urged toward each other to compress the resilient flexible member therebetween to deform the flexible resilient member and frictionally engage the pipe end sections.

The flexible resilient member also has a pair of ring members extending outwardly from the front and rear walls and an inwardly extending ring portion forming front and rear shoulder portions. The pipe end sections are inserted in the flexible member central bore until their end walls abut the respective front and rear shoulder portions. The flexible member ring portions have an outer diameter slightly smaller than the diameter of the end plate apertures so that the ring members extend through the end plate apertures. As the end plates are urged toward each other the flexible member ring portions literally extrude and grip the pipe end sections therebetween. The resilient flexible member has a peripheral groove therearound intermediate the end plates in which there is positioned an intermediate plate which may be molded therein during fabrication of the resilient flexible member to provide rigidity to the coupling.

Accordingly, an object of this invention is to provide a flexible pipe coupling which does not require special tools to secure the coupling to the end sections.

Another object of this invention is to provide a flexible pipe coupling that compensates for minor pipe flexing or deviation in alignment between pipe sections.

Another object of this invention is to provide a pipe coupling that serves as an expansion joint and provides a means to permit the pipe sections to expand or contract under temperature changes without pipe damage.

A further object of this invention is to provide a pipe coupling that is simple and economical to manufacture, sturdy in construction and easily assembled.

These and other objects and advantages of this invention will be more completely disclosed and described in the following specification, the accompanying drawings and the appended claims.

In the accompanying drawings, to be taken as part of this specification, I have fully and clearly illustrated my invention, in which drawings:

FIGURE 1 is a perspective view of one embodiment of my pipe coupling having portions cut away to illustrate the construction of the flexible resilient member.

FIGURE 2 is a view in end elevation illustrating the pipe coupling end plate construction.

FIGURE 3 is a view in section taken along the line 3—3 of FIGURE 2.

Figure 4:
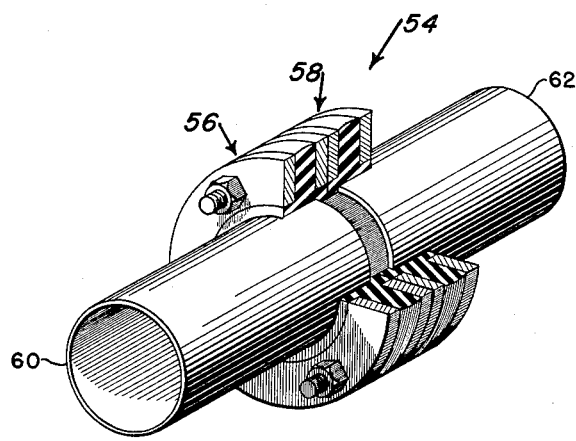
FIGURE 4 is a perspective view of another embodiment of my invention having portions cut away to illustrate the flexible resilient members.

Referring to the drawings and particularly to FIGURES 1, 2, and 3, there is shown one embodiment of my invention illustrating my pipe coupling generally designated by the numeral 10 which secures or connects two pipe end sections 12 and 14 to each other. The flexible coupling 10 has a resilient flexible member 16 with a central bore 18 therethrough. The resilient member 16 has a front wall 20 and a rear wall 22. Annular ring members 24 extend outwardly from both front wall 20 and rear wall 22. The ring members 24 have an internal diameter substantially equal to the diameter of the resilient member bore 18.

The resilient member 16 has an inwardly extending ring portion 26 in the bore 18 intermediate the end walls 20 and 22. The inwardly extending ring portion 26 forms an annular front shoulder 28 and an annular rear shoulder 30 within the bore 18. The resilient member 16 has a peripheral groove 32 intermediate the end walls 20 and 22 which is in overlying relation with the inwardly extending ring portion 26. The groove 32 has an internal diameter substantially equal to the external diameter of the annular ring members 24. The groove 32 is adapted to receive an annular intermediate plate 34, which may be positioned in the resilient member 16 as it is molded or fabricated to provide rigidity to the resilient member 16 and limit extrusion of the resilient member 16 in the vicinity of the inwardly extending ring 26.

The resilient member 16 has a plurality of longitudinal passageways 36 in radial spaced relation with the central bore 18. The intermediate plate 34 has apertures 38 therethrough which are aligned with the passageways 36. A pair of end plates 40 each have a central aperture 42 therethrough. Aperture 42 has a diameter slightly larger than the diameter of the resilient member annular ring portion. The end plates 40 also have a plurality of other apertures 44 in radial spaced relation with the central aperture 42. The respective end plates 40 are positioned in abutting relation with the respective flexible member walls 20 and 22. A plurality of bolts 46 having enlarged head portions 48 and threaded other end portions 50 extend through the respective aligned apertures 44, 38 in the plates 40 and 34 and through the resilient member passageways 36. Nuts 52 are threadedly secured to the bolt end portions 50 and are adapted to apply a compressive force on the end plates 40 to urge the plates 40 toward each other and compress the resilient member 16 therebetween.

The pipe end sections 12 and 14 are inserted in the resilient member central bore 18 until their end portions abut the respective shoulders 28 and 30. As the nuts 52 are tightened on the bolts 46 the end plates 40 are urged toward each other and compress the flexible resilient member 16 therebetween. As the resilient member 16 is compressed the bore 18 grips the external surface of the pipe end sections 12 and 14 to couple the same to each other. Further tightening of the nuts 52 further urges the bore of the resilient member 16 into gripping relation with the pipe end section outer surface and the resilient member ring portions 24 extrude outwardly between the pipe end section upper surface and the end plates. Portions of the resilient member 16 also extrude radially outward between the intermediate plate 34 and the end plates 40.

The coupling device previously described maintains a tight fluid seal, is easily positioned on and secured to the pipe end sections. Further, because the resilient qualities of the member 16 minor flexing in the pipe end sections relative to each other may be compensated for by the flexible coupling 10. The resilient member inner ring 26 provides a means to absorb limited expansion of the pipe end sections.

Although the flexible pipe coupling 10 is illustrated as having a rectangular peripheral dimension it should be understood that other configurations are within the scope of this invention.

Figure 5:
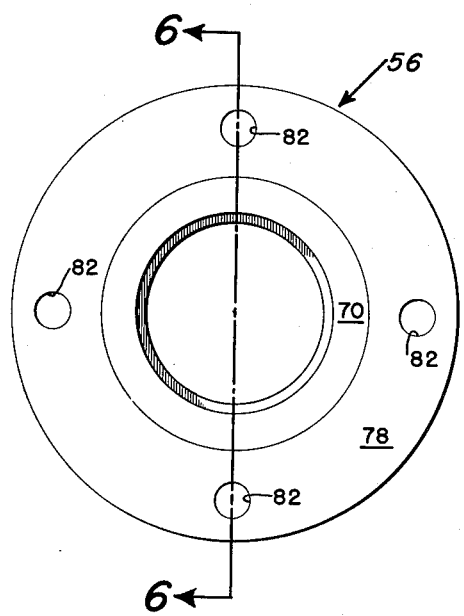
FIGURE 5 is a view in end elevation of one of the end plates of the embodiment illustrated in FIGURE 4.
Figure 6:
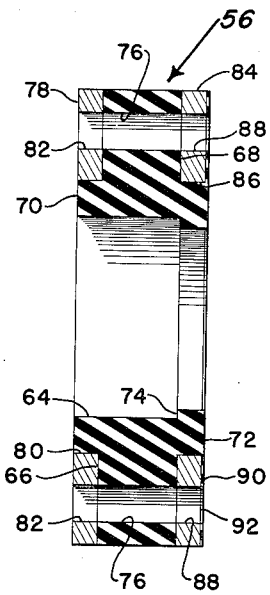
FIGURE 6 is a view in section taken along the line 6—6 of FIGURE 5 with the pipe end section removed therefrom.

Now referring to the embodiment illustrated in FIGURES 4, 5 and 6, there is shown another embodiment of my flexible coupling generally designated by the numeral 54 which includes a pair of similar flange members 56 and 58 with pipe end sections 60 and 62 coupled thereby. The resilient flexible flange members 56 and 58 are similar in construction and similar numerals will indicate similar parts.

The resilient flange members both have a central bore 64 therethrough, a front wall 66 and a rear wall 68. The flange front wall 66 has an annular ring portion 70 extending outwardly therefrom with an internal diameter substantially equal to the diameter of the bore 64. The flange member 56 has a second annular ring portion 72 extending rearwardly therefrom. The ring portion 72 has an internal diameter smaller than the diameter of the flange bore 64 to thereby form an internal shoulder portion 74. The flange 56 has an outer circular dimension with a plurality of longitudinal passageways 77 therethrough in spaced relation to the central bore 64.

An annular end plate 78 has a central aperture 80 therethrough which has a diameter substantially equal to the outer diameter of the flange ring portion 70. The end plate 78 has a plurality of radially spaced apertures 82 therethrough which are aligned with the flange passageways 76 as the end plate 78 is positioned in abutting relation with the front wall 66. An intermediate plate 84, substantially similar in construction to end plate 78, has a central aperture 86 therethrough which is substantially the same as the outer diameter of the flange rearwardly extending ring porton 72. The intermediate plate 84 also has a plurality of radially spaced apertures 88 that are aligned with the flange passageways 76. The intermediate plate 84 is positoned in abutting relation with the rear wall of the flange 56. A film of resilient material 90 covers the rear face 92 of the intermediate plate 84.

In practice the pipe end section 60 is inserted in the resilient flange bore 64 until the pipe end wall abuts the inner shoulder 74. To couple two pipe end sections to each other the flanges 56 and 58 are positioned with the intermediate plate rear faces 92 in abutting relation with each other and the respective passageways 76 aligned with each other. Bolts having enlarged head portions are inserted through the aligned apertures 82 in end plates 78 and flange passageways 76. Nuts are threadedly secured to the other end of the bolts and are arranged to urge the pair of end plates 78 toward each other. As the end plates 78 are urged toward each other the pipe end sections 60 and 62 are frictionally engaged by the inner bore of the respective flange members 56 and 58 to couple both the flanges 56 and 58 and respective pipe sections 60 and 62. Thus the bolts not only serve as a means of connecting the flanges 56 and 58 to each other but also serve as a means for frictionally engaging the flanges 56 and 58 to the respective pipe end sections and further to deform the end sections and thereby more firmly grip the external surface of the pipe end sections.

According to the provisions of the patent statutes, I have explained the principle, preferred construction, and mode of operation of my invention and have illustrated and described what I now consider to represent its best embodiments. However, I desire to have it understood that, within the scope of the appended claims, the invention may be practiced otherwise than as specifically illustrated and described.

I claim:

1. A pipe coupling comprising in combination a resilient flexible member having a central cylindrical bore therethrough and a plurality of longitudinal passageways extending therethrough, said passageways arranged in spaced radial relation to said central bore, said flexible member having a front wall, a rear wall and an outer peripheral surface, both of said walls having an annular ring portion extending outwardly therefrom, said ring portions each having an inner diameter substantially equal to the diameter of said bore, said flexible member having an annular portion extending into said bore intermediate said front and rear walls, said inwardly extending annular portion having a bore therethrough coaxial with said central bore and smaller in diameter than said central bore, said inwardly extending portion forming an annular front shoulder portion and an annular rear shoulder portion, said flexible member having a peripheral groove in said outer peripheral surface intermediate said front and rear walls, a pair of rigid end plates and an intermediate plate, each of said plates having a central aperture therethrough, said end plate central apertures having a diameter greater than the diameter of said flexible member central bore, said plates having other apertures therethrough arranged in spaced radial relation with said central aperture, said flexible member ring portions having an outer diameter substantially equal to the diameter of said end plate central aperture, said intermediate plate positoned in said flexible member peripheral groove between said front wall and said rear wall with said radial apertures aligned with said flexible member passageways, one of said end plates positioned in abutting relation with said flexible member front wall with said flexible member ring portion extending through said end plate aperture and said radial apertures aligned with said flexible member longitudinal passageways, said other end plate positioned in abutting relation with said flexible member rear wall with said ring portion extending through said end plate aperture and said radial apertures aligned with said flexible member longitudinal passageway, a first pipe end section positioned in said bore and having an end wall abutting said annular front shoulder portion, a second pipe end section positioned in said bore and having an end wall abutting said annular rear shoulder portion, a plurality of bolt members having enlarged head portions and threaded other end portions and said bolt members extending through said respective aligned plate apertures and said flexible member passageways with said enlarged head portion abutting one of said plate members, and a plurality of nuts secured to said bolt threaded end portions, said nuts adapted to urge said rigid end plates toward each other and compress said flexible member between said respective end plate and said intermediate plate to thereby deform said flexible member into gripping relation with said pipe end sections and extrude outwardly said flexible outer peripheral surface, said intermediate plate operable to limit outward extrusion of said flexible member adjacent said inwardly extending annular portion.

2. A pipe coupling comprising in combination a resilient flexible member having a central cylindrical bore therethrough and a plurality of longitudinal passageways extending therethrough, said passageways arranged in spaced radial relation to said central bore, said flexible member having a front wall, a rear wall and an outer peripheral surface, both of said walls having an annular ring portion extending outwardly therefrom, said ring portions each having an inner diameter substantially equal to the diameter of said bore, said flexible member having an annular portion extending into said bore intermediate said front and rear walls, said inwardly extending annular portion having a bore therethrough coaxial with said central bore and smaller in diameter than said central bore, said inwardly extending portion forming an annular front shoulder portion and an annular rear shoulder portion, said flexible member having a peripheral groove in said outer peripheral surface intermediate said front and rear walls and in overlying relation with said inwardly extending annular portion, a pair of rigid end plates and an intermediate plate, each of said plates having a central aperture therethrough, said plate central apertures each having a diameter greater than the diameter of said flexible member central bore, said plates having other apertures therethrough arranged in spaced radial relation with said central aperture, said flexible member ring portions having an outer diameter substantially equal to the diameter of said end plate central aperture, said peripheral groove having an internal diameter substantially equal to the diameter of said plate central aperture, said intermediate plate positioned in said flexible member peripheral groove between said front wall and said rear wall with said radial apertures aligned with said flexible member passageways, one of said end plates positioned in abutting relation with said flexible member front wall with said flexible member ring portion extending through said end plate aperture and said radial apertures aligned with said flexible member longitudinal passageways, said other end plate positioned in abutting relation with said flexible member rear wall with said ring portion extending through said end plate aperture and said radial apertures aligned with said flexible member longitudinal passageway, a first pipe end section positioned in said bore and having an end wall abutting said annular front shoulder portion, a second pipe end section positioned in said bore and having an end wall abutting said annular rear shoulder portion, a plurality of bolt members having enlarged head portions and threaded other end portions and said bolt members extending through said respective aligned plate apertures and said flexible member passageways with said enlarged head portion abutting one of said plate members, and a plurality of nuts secured to said bolt threaded end portions, said nuts adapted to urge said rigid end plates toward each other and compress said flexible member between said respective end plate and said intermediate plate to thereby deform said flexible member into gripping relation with said pipe end sections and extrude outwardly said flexible outer peripheral surface, said intermediate plate operable to limit outward extrusion of said flexible member adjacent said inwardly extending annular portion.

3. A pipe coupling comprising in combination a pair of flexible resilient flange members each having a central cylindrical bore therethrough, said flange members each having a front wall, a rear wall, and an outer circumferential surface, said front and rear walls each having an annular ring portion extending outwardly therefrom, said flange members each having an inwardly extending annular portion adjacent said rear wall, said inwardly extending portion having a bore therethrough coaxial with said central bore and smaller in diameter than said central bore, said ring portion adjacent said front wall having an internal diameter substantially equal to the diameter of said central bore, a pair of rigid end plates each having a central aperture therethrough with a diameter greater than the diameter of said flange central bore, said flange ring portions adjacent said front walls having an outer diameter substantially equal to the diameter of said rigid end plate central apertures, said end plates positioned in abutting relation with each of said flange front walls with said ring portions adjacent said front walls extending through said plate apertures, each of said flange bores adapted to receive separate pipe end sections, intermediate plate means positioned in abutting relation with each of said flange rear walls, said intermediate plate means having central apertures through which said ring portions adjacent said flange rear walls extend, said flange members positioned with said rear walls in abutting relation to said intermediate plate means, and means to connect said flange members to each other, said last named means including means to urge said end plates toward each other and compress said flexible flange members between said end plates and said intermediate plate means to thereby deform said flange members into gripping relation with said respective pipe end sections and extrude radially outwardly said flange member outer circumferential surfaces, said intermediate plate means operable to limit outward extrusion of said flexible flange members adjacent said inwardly extending annular portions.

References Cited in the file of this patent
UNITED STATES PATENTS

| | | |
|---|---|---|
| 1,772,915 | Rosenberg | Aug. 12, 1930 |
| 2,084,761 | Bradley | June 22, 1937 |
| 2,197,450 | Curtis | Apr. 16, 1940 |
| 2,297,506 | Schmidt | Sept. 29, 1942 |
| 2,334,663 | Whitney | Nov. 16, 1943 |
| 2,669,465 | Newell | Feb. 16, 1954 |

FOREIGN PATENTS

| | | |
|---|---|---|
| 52,283 | Denmark | Sept. 26, 1936 |
| 681,662 | Great Britain | Oct. 29, 1952 |